United States Patent [19]
Hunkeler

[11] 3,961,403
[45] June 8, 1976

[54] CUTTER HEAD ASSEMBLY FOR GEAR CUTTING MACHINERY

[75] Inventor: Ernst J. Hunkeler, Fairport, N.Y.

[73] Assignee: The Gleason Works, Rochester, N.Y.

[22] Filed: Apr. 9, 1975

[21] Appl. No.: 566,509

Related U.S. Application Data

[62] Division of Ser. No. 428,989, Dec. 27, 1973, Pat. No. 3,881,889.

[52] U.S. Cl. .............................................. 29/105 A
[51] Int. Cl.² ........................................ B26D 1/12
[58] Field of Search ..................... 29/105 R, 105 A

[56] References Cited
UNITED STATES PATENTS

| | | | |
|---|---|---|---|
| 1,445,448 | 2/1923 | Reisinger | 29/105 A |
| 1,903,988 | 4/1933 | Fickett | 29/105 A |
| 1,927,409 | 9/1933 | Markstrum | 29/105 A |
| 2,033,384 | 3/1936 | Marshall | 29/105 A |
| 2,126,004 | 8/1938 | Gleason | 29/105 A |
| 3,268,980 | 8/1966 | Blakesley | 29/105 A |
| 3,323,192 | 6/1967 | Gustafson | 29/105 R |

*Primary Examiner*—Harrison L. Hinson
*Attorney, Agent, or Firm*—Ralph E. Harper

[57] ABSTRACT

A cutter head assembly for gear cutting machines is described as including an arrangement of blade-receiving slots set at specific angles to a longitudinal axis of the assembly so as to permit removal, resharpening, and replacement of different types of blades into such slots. The blades which are used with the cutter head assembly of this invention are of a type which can be resharpened without removing stock from their cutting faces.

2 Claims, 6 Drawing Figures

CUTTER HEAD ASSEMBLY FOR GEAR CUTTING MACHINERY

RELATED APPLICATION

This application is a divisional of U.S. Ser. No. 428,989, filed Dec. 27, 1973, now U.S. Pat. No. 3,881,889 patented May 6, 1975.

BACKGROUND AND BRIEF DESCRIPTION OF INVENTION

The present invention relates to improvements in cutter head assemblies for gear cutting machines. The invention permits use of faster and greatly simplified resharpening techniques for cutting blades by its provision for cutter head assemblies which are specifically designed and constructed to accommodate cutting blades which can be resharpened without removal of material from their cutting faces.

It is known in the art of gear cutting machines to provide various designs of individual cutting blades to be fitted in a cutter head assembly so that the cutting blades can function to generate tooth profiles in a workpiece. Typically, the cutting blades used with such cutter head assemblies have been relatively complex in their design and have been costly to resharpen and replace because of the difficulty in maintaining critical angular relationships between front, end, and side faces of each cutting blade. Cutter head assemblies for such blades have been, on the other hand, relatively simple.

Numerous attempts have been made to reduce the initial and resharpening costs of cutting blades for various types of milling cutters. For example, it is known to place individual cutting blades in radially inclined slots in a milling head assembly for the purpose of establishing a pre-set pressure angle for each blade without a requirement for a regrinding of the surface which establishes such an angle (see U.S. Pat. No. 3,673,655). Other types of milling tools have provided for an angular placement of cutting blades in a cutter head so as to establish rake and shear angles for a front face of the cutting blades (see U.S. Pat. No. 2,186,417).

The present invention is specifically concerned with improvements in cutter head assemblies designed for use in gear cutting machinery capable of generating tooth profiles for spiral, bevel and hypoid gears. In applications of this type, dimensional relationships of the cutting tools are extremely critical and must be maintained to close tolerances in order to obtain a desired tooth profile for each tooth and slot of the final gear product. One of the relationships which must be carefully maintained is the angle and position of the cutting face (or chip face) of each cutting blade relative to the cutter head assembly in which it is carried and to the workpiece which is being cut. Although cutting blades of the type shown in U.S. Pat. No. 2,186,417 require no resharpening of their front faces, it is believed that all prior efforts in designing and resharpening cutting tools for gear cutting applications have required a careful resharpening of the cutting face each time the cutting tool is resharpened for further usage in a cutter head assembly (see, for example, U.S. Pat. No. 3,487,592). This requirement of past designs not only adds to the cost of use of a particular tool, but also prevents the usage of certain hard coatings on a steel substrate because such coatings would be removed during the resharpening process.

In contrast to prior art methods and means, the present invention provides for a novel cutter head assembly which permits use of individual cutting blades which can be easily resharpened in such a manner that all of the critical relationships required for gear cutting applications are maintained while a front face surface of each cutting blade is preserved during each resharpening. Blades of this type not only eliminate the cost and difficulty of resharpening the critical front face parameter for each cutting blade tool but also permit the use of unusual material combinations or treatments, such as titanium carbide or chromium coatings with high speed steel substrates, for cutting tools having longer life and greater strength.

Thus, a cutter head assembly is specifically designed in accordance with the present invention to receive a type of individual cutting blade which can be sharpened without removing material from a cutting face (or chip face) thereof. The cutter head assembly is characterized by an arrangement of blade-receiving slots set at angles to correspond to front face angles for each cutting blade relative to its contact with a workpiece so that the cutting blades can be removed, resharpened and replaced into such slots without removing any stock from their cutting faces.

In a specific embodiment of the invention, a cutter head assembly is provided with a plurality of clamping slots formed into its periphery for receiving clamping members which secure cutting blades in the assembly. Two or more blade-receiving slots are formed in communication with each clamping slot so that blades can be arranged to cut different portions of a slot.

These and other features and advantages of the present invention will become apparent in the more detailed discussion which follows. In that discussion reference will be made to the accompanying drawings as briefly described below.

DETAILED DESCRIPTION OF INVENTION

Figure 1:
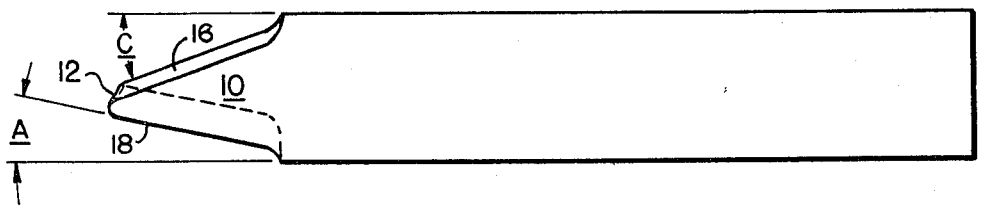
FIG. 1 is a face view of a single cutting blade of a type which may be used with the cutter head assembly of this invention.
Figure 2:
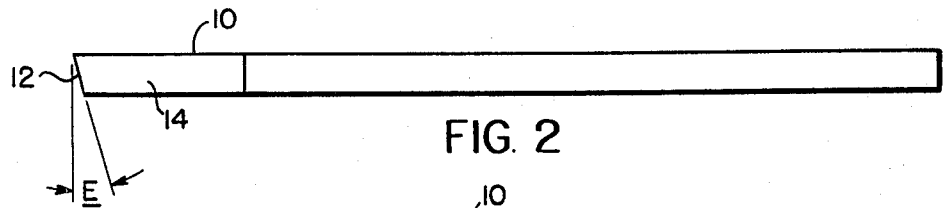
FIG. 2 is a side elevation of the cutting blade illustrated in FIG. 1.
Figure 3:
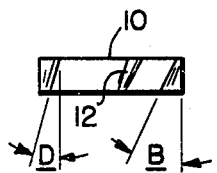
FIG. 3 is an end elevational view of the cutting blade illustrated in FIG. 1.

FIGS. 1–3 illustrate a type of cutting blade which can be formed and used in a cutter head assembly for gear cutting machines in accordance with the teachings of the present invention. The illustrated cutting blade may be formed from relatively thin stock material, as illustrated, or thicker material may be used. Active cutting surfaces of the cutting blades can be resharpened by a method which maintains critical angular relationships between a front face 10, an end face 12, a first side face 14, and a second side face 16 without removing a layer of stock from the front face 10. The illustrated cutting blade is of an unusual design for gear cutting applications because it can be resharpened without removing any material from its active cutting face 10 (also referred to as a chip face for such a cutting tool). By preserving the original condition of the front face 10, it is possible to treat the cutting face in some way to improve its hardness or other metallurgical characteristics. The front face 10 may be nitrided or coated (such as by vapor deposition) with any selected material which will improve the basic qualities of the high speed steel material from which it may be made. For example, the front face 10 may be coated with titanium carbide or some other suitable coating material to improve the life or cutting characteristics of the cutting blade. It can be appreciated that a removal of material from the end face 12 and the two side faces 14 and 16 will necessarily remove some material from the front face 10 during each resharpening procedure, however, the portion of the front face 10 which remains after each resharpening will be preserved with whatever coating material or other treatment is applied thereto without removal of any layers of stock from that front face.

The method for resharpening the cutting blade illustrated in FIGS. 1–3, while maintaining critical angular relationships between front, end and side faces of the cutting blade, comprises a first step of removing stock from the first side face 14 so as to establish a pressure angle A (see FIG. 1) and a side relief angle B (see FIG. 3) for the side face 14 without removing a layer of stock from the front face 10. This removal of stock also defines a cutting edge 18 between the side face 14 and the front face 10 of the cutting blade.

A second step of the resharpening method involves the removal of stock from the second side face 16 of the cutting blade so as to establish a clearance angle C (see FIG. 1) and a side relief angle D (see FIG. 3) on the side face 16. Again, this step is carried out without removing a layer of stock from the front face 10 of the cutting blade.

The end face 12 is also sharpened by a step of stock removal so as to establish a top relief angle E (see FIG. 2) and a radius on the end face 12 of the cutting blade. Thus, the end face 12 and side faces 14 and 16 are resharpened to maintain all critical angular relationships for the cutting blade without removal of stock from the surface of the cutting face 10 of the illustrated blade. The blade may be resharpened for as many times as there is sufficient material in its main body portion, and after each resharpening, the blade can be reinserted into a cutter head assembly and adjusted axially to a preferred position for making contact with a workpiece.

There is no requirement for resharpening the back face of each blade, as is known from prior sharpening techniques.

Figure 4:
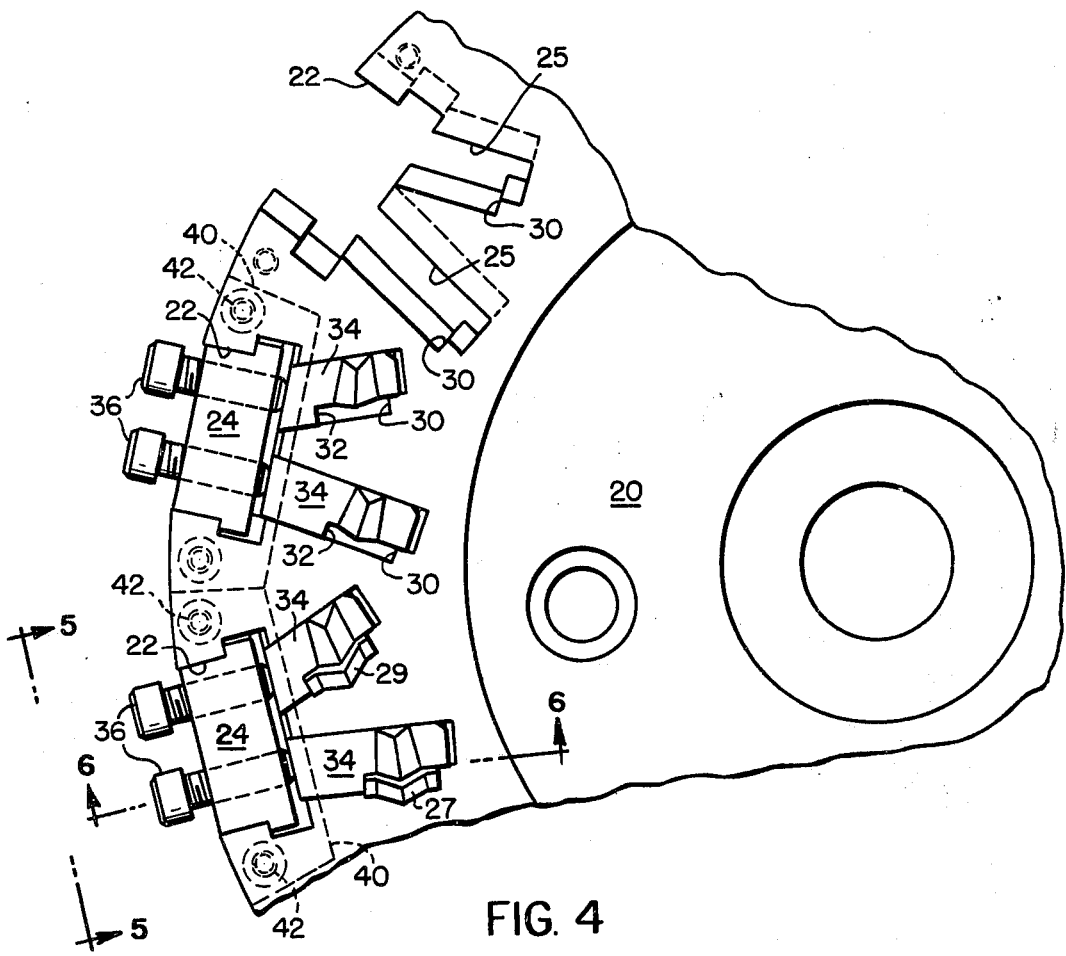
FIG. 4 is a front elevational view, partly in section, of a portion of a cutter head assembly of the type contemplated by this invention.
Figure 5:
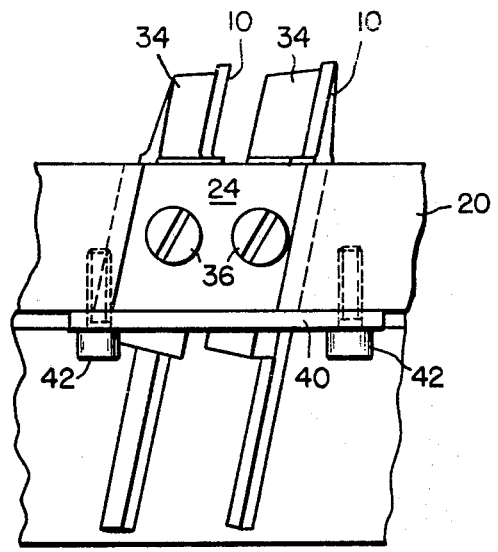
FIG. 5 is a side elevational view of a portion of the cutter head assembly illustrated in FIG. 4.
Figure 6:
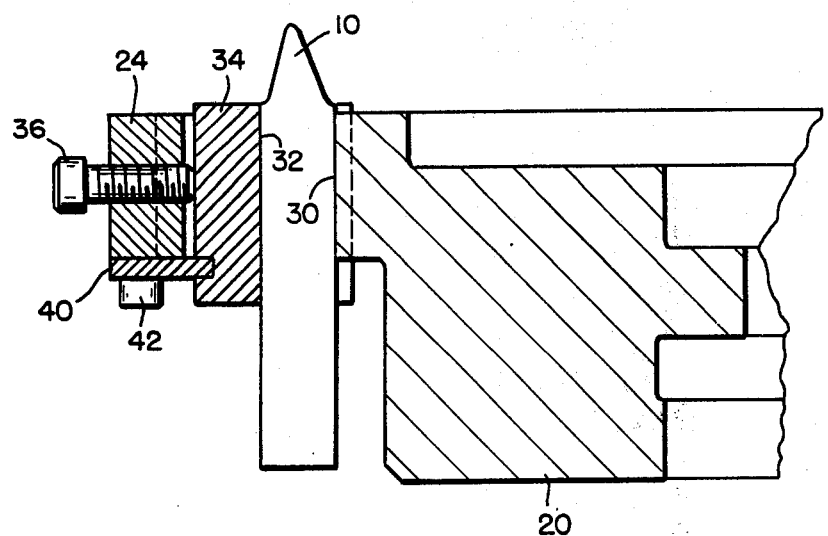
FIG. 6 is an elevational view, in radial section along line 6—6 of FIG. 4.

FIGS. 4–6 illustrate portions of a cutter head assembly which is specifically designed to carry the type of cutting blade illustrated in FIGS. 1–3. FIG. 4 illustrates a front elevational view of a segment of a cutter head assembly having a disc-shaped cutter head body 20. The cutter head body is formed in a known fashion to include means for being mounted on a spindle of a gear cutting machine. The cutter head body includes a plurality of clamping slots 22 formed into its periphery for receiving clamping members 24. Only three clamping slots 22 are illustrated in the FIG. 4 view, and it can be seen that each clamping slot is identical in form and equally spaced from next adjacent slots about the periphery of the cutter head body. Two clamping members 24 are shown in position in the FIG. 4 illustration, and the third clamping slot is shown without any clamping member or cutting blades in place. Each clamping slot 22 includes two or more blade-receiving slots 25 formed in communication therewith so that a single clamping member 24 can function to secure two or more cutting blades in each position. In this way blades having different cutting functions can be arranged in sets with each clamping member to assure a precise relationship between positions of blades in each set. For example, in the illustrated embodiment each clamping slot 22 is provided with only two communicating blade-receiving slots so that an inside blade 27 and an outside blade 29 can be received at each clamping slot position. Other arrangements may provide for three blade-receiving slots so that inside, outside, and bottoming blades can be provided at each clamping slot position.

Individual cutting blades are received into the blade-receiving slots 25 so that one side face of the main body of each blade is abutted against an end wall 30 formed in each blade-receiving slot. When relatively thin blades are used, an opposite side face of the main body of each cutting blade is engaged by a ledge portion 32 of a supporting block 34 inserted into each blade-receiving slot 24. When the supporting blocks 34 are inserted into their respective blade-receiving slots 25 so as to engage an individual cutting blade therein, the clamping force applied to each supporting block functions to apply sufficient friction to the opposite side edges of the cutting blade body so as to retain the cutting blade in its set position within the cutter head assembly. It can be appreciated that clamping forces are applied to the individual supporting blocks by separate screw members 36 which are threaded through the clamping members 24 so as to contact and engage exposed ends of each supporting block 34. As shown in the lowermost positions in the FIG. 4 illustration, and in FIG. 5, the supporting blocks 34 are shaped and dimensioned to nearly correspond to the overall profile of the cutting ends of each cutting blade. This provides full support for each cutting blade during its engagement with a workpiece and allows for a nominal amount of wear of the cutting edge of the blade during its use. The main body portion of each cutting blade is preferable formed with parallel surfaces formed at right angles to each other.

As shown in FIGS. 5 and 6, the cutter head assembly may be provided with plate structures 40 secured to a rear face of the cutter head body by fastening elements 42 so as to prevent the clamping members 24 and the supporting blocks 34 from falling downwardly (in the attitude of FIG. 6) when the clamping screws 36 are loosened to remove and replace individual cutting blade elements.

FIG. 5 illustrates a characteristic inclination of the blade-receiving slots of the cutter head assembly so as to define and set an angular relationship of each front face 10 of each blade relative to a longitudinal axis of the cutter head assembly and to the workpiece which will be contacted by the cutting blades. Each time a cutting blade is removed and resharpened, it can be reinserted into the cutter head assembly, and the angular relationship of its front face 10 will be automatically re-established by the angle of inclination of the blade-receiving slot into which the blade is inserted. Thus, cutting blades can be removed, resharpened, and replaced into their respective slots without removing any stock from their cutting faces.

Although the invention has been described with reference to a single embodiment of a cutter head assembly, it will be appreciated that other designs of cutter head assemblies may be used for accomplishing the same purposes without departing from the basic concepts of this invention.

What is claimed is:

1. An improved cutter head assembly for use with a gear cutting machine, comprising
   a disc-shaped cutter head body,
   a plurality of clamping slots formed into the periphery of said cutter head body for receiving clamping members;
   two or more blade-receiving slots formed in open communication with each of said clamping slots, each of said blade-receiving slots being of a sufficient size and shape to receive a single cutting blade, said blade-receiving slots being formed at angles to longitudinal axes of said cutter head body so that cutting faces of cutting blades can be carried at angles corresponding to the angles of said slots, whereby the cutting blades can be removed, resharpened, and replaced into said slots without removing any stock from their cutting faces,
   a plurality of cutting blades which can be inserted and clamped into the cutter head body so as to project axially outwardly from one face of said cutter head body, and
   a plurality of clamping members for securing said cutting blades in place, each of said clamping members being provided with separate screw members for bearing against each separate cutting blade carried by the blade-receiving slots associated therewith.

2. The improvement of claim 1 wherein three blade-receiving slots are formed in communication with each of said clamping slots.

\* \* \* \* \*